June 16, 1931. A. CARLSON ET AL 1,810,870
COVER FASTENER AND THE LIKE
Filed June 27, 1929 2 Sheets-Sheet 1
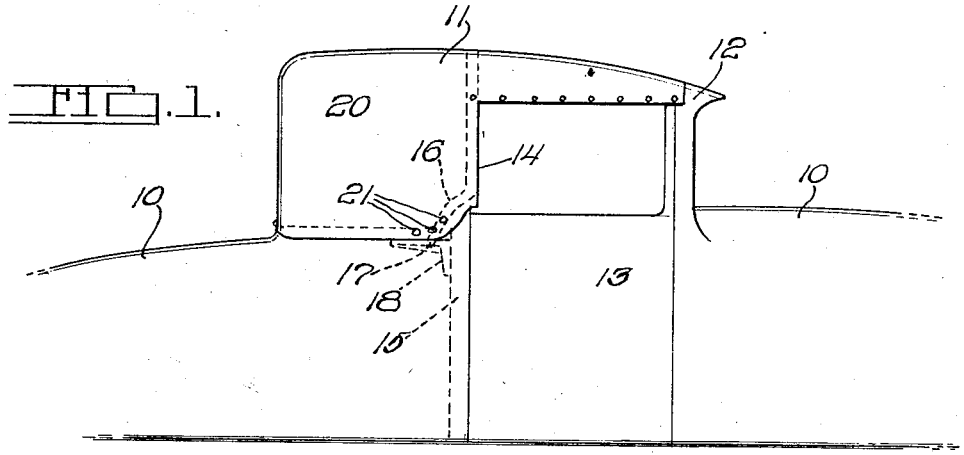
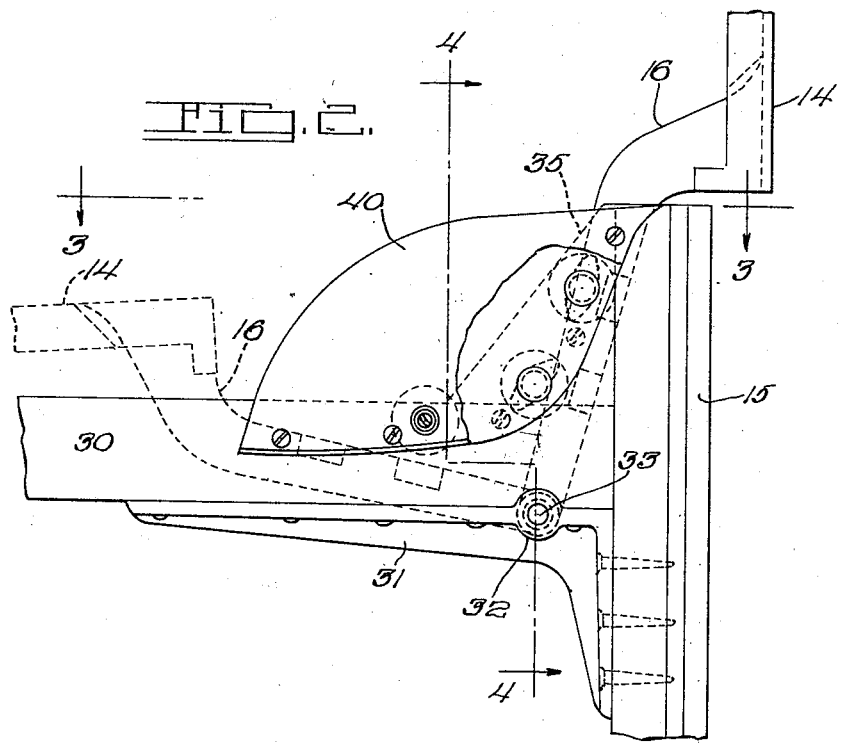
Inventors
Eric W. Ericson
Alexander Carlson
by Harness Dickey & Pierce
Attorneys.

June 16, 1931.  A. CARLSON ET AL  1,810,870
COVER FASTENER AND THE LIKE
Filed June 27, 1929  2 Sheets-Sheet 2
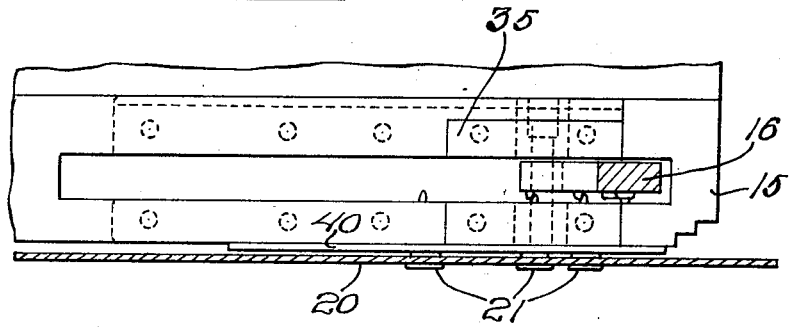
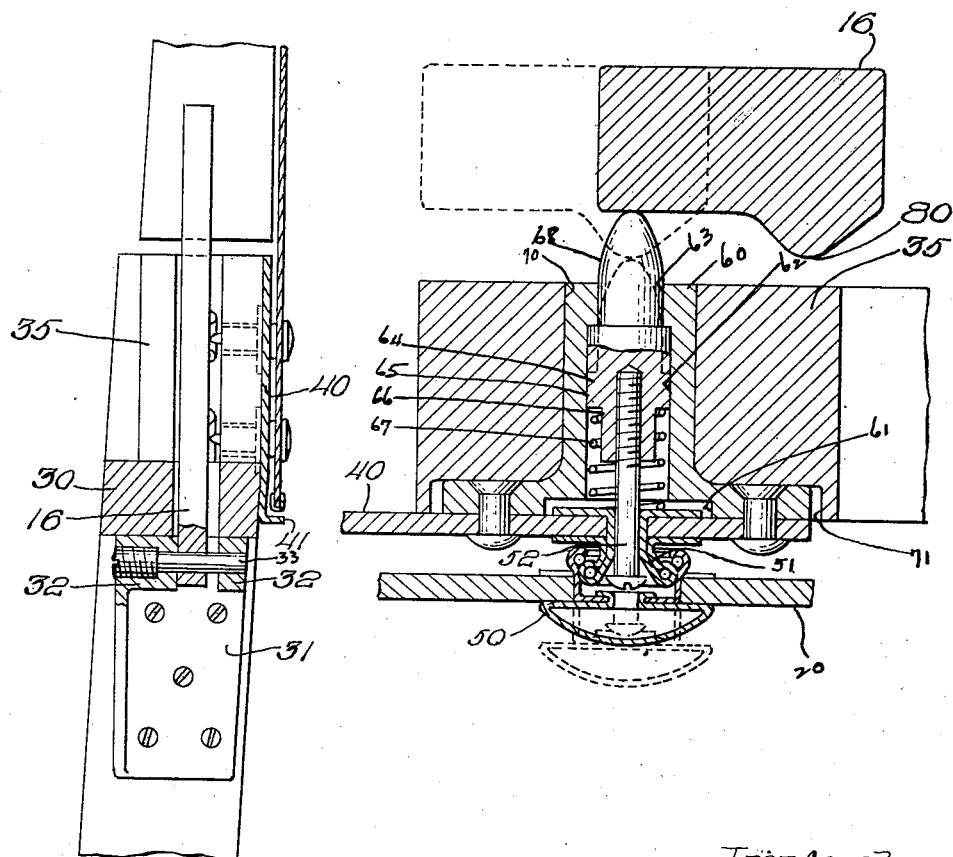
Inventors
Eric W. Ericson
Alexander Carlson
by Harness Dickey & Pierce
Attorneys.

Patented June 16, 1931

1,810,870

UNITED STATES PATENT OFFICE

ALEXANDER CARLSON AND ERIC W. ERICSON, OF DETROIT, MICHIGAN, ASSIGNORS TO DIETRICH INCORPORATED, A CORPORATION OF MICHIGAN

COVER FASTENER AND THE LIKE

Application filed June 27, 1929. Serial No. 374,221.

One object of our invention is to provide means for automatically disengaging the flexible cover of a folding vehicle top from the fixed body structure when the top is being folded.

Another object of our invention is to provide automatically releasable cover fastenings for folding vehicle tops.

Another object of our invention is to provide a novel releasing means for a cover fastener.

With these and other objects in view, our invention consists in the arrangement, combination and construction of the various parts of our improved device, as described in the specification, claimed in our claims, and shown in the accompanying drawings, in which:

Fig. 1 is a side elevation of a vehicle body indicating the location and relation of our invention thereto.

Fig. 2 is an enlarged sectional view of that portion of the frame work of a vehicle body embodying our invention.

Fig. 3 is a view taken on the line 3—3 of Fig. 2.

Fig. 4 is a view taken on the line 4—4 of Fig. 2.

Fig. 5 is an enlarged sectional view of our device showing its construction, attachment and relation to the vehicle body members.

Our invention is illustrated in connection with the type of vehicle known as "cabriolet". It is to be understood, however, that it may be used in other types where it may be found desirable, and in situations not connected with vehicle bodies, and that we claim all uses to which it may be put.

The cabriolet style body is ordinarily designed for two or three passengers and incorporates features of the coupe style having rigid and permanent top constructions, and of the roadster style having a collapsible or foldable top construction. In the roadster type it is necessary to utilize separate curtains to enclose the passenger compartment. These cannot be made as weathertight as desirable. In the coupe type the top is permanently fixed in place and cannot be folded or collapsed. The cabriolet embodies the collapsible top, and doors carrying sliding glass panels, which eliminates the necessity for separate curtains.

The numeral 10 indicates generally the cabriolet body. The numeral 11 indicates the collapsible top, all of which, to the rear of the windshield 12, may be folded rearwardly to clear the passenger compartment. The doors 13 are provided with sliding glass panels (not shown) which may be adjusted to close the upper part of the door opening beneath the forward portion of the collapsible top, the rear vertical edge of the glass panel abutting against the forward edge of the transverse bow member 14 which overhangs the rear door post 15. The ends of the bow 14 are supported by arms 16 which are pivoted at 17 in brackets 18 secured to the rear upper side of the door posts 15.

When the top 11 is collapsed, the bow member 14 and the arms 16 are in the position shown in the dotted lines in Fig. 2, this necessitates a crumpling and folding of the flexible covering material designated generally by the numeral 20, which covers the rear side quarters of the passenger compartment when the top is in raised position. The cover 20 may be either permanently or detachably fastened to the upper edge of the body 10 around the sides of the seat and to the bow member 14. It must, however, be detachably fastened along that edge which is adjacent the arm 16 and its pivot point 17, at the points indicated by the numeral 21 in order that it may be released to prevent tearing when the top is folded. Ordinarily, these fasteners, indicated generally by the numeral 21, are conventional snap fasteners of the button-socket type. It frequently happens that the owner or operator of the vehicle having the type of top described, will forget or neglect to release the fasteners 21 before he collapses the top, and as a result, the fasteners are torn out and the top material to which they are attached is frequently torn. In order to avoid this trouble, we have provided snap fasteners which will be automatically released upon movement of the arm member 16 as it swings rearwardly on its pivot 17.

The permanent body structure comprises a door post 15, a rearwardly extending horizontal frame member 30, which is attached to the rear side of the door post 15 adjacent its top by means of an angle bracket 31. Adjacent the angle of the bracket is provided a bifurcated bearing member 32, shown more clearly in Fig. 4, through which extends a pin 33 upon which is pivotally supported the end of the arm 16. The other end of the arm 16 is secured to the lower end of the bow member 14. The end of the frame member 30 adjacent the door post 15 is vertically slotted as shown in Fig. 4, to provide for the working of the arm 16. A slotted gusset member 35 indicated in dotted lines in Fig. 2 is secured between the upper side of the horizontal frame member 30 and the upper end of the post 15. The vertical slot in this gusset member registers with the vertical slot in the member 30 to permit the working of the arm 16. A sheet metal corner plate, indicated by the numeral 40, is secured to the outside of the post 15 and the frame member 30 and the gusset member 35. This plate serves as a mounting for parts of the cover fasteners which are mounted therein before the plate is attached to the body framing. The plate is also provided with a lateral flange 41 along its lower and forward edges which forms a shield and abutment for the corner edge of the cover 20.

The separable fasteners designated generally by the numeral 21 and shown in detail in Fig. 5, comprise a socket button 50 which is inserted through and clamped to the covering material 20 with the socket presented inwardly toward the plate 40. The cooperating male member 51 of the fastener comprises a cup member of spring steel formed with an outwardly flared rim which is presented outwardly of the plate 40 and adapted to be inserted into the female member 50. The male member 51 has a portion extending through an opening in the plate 40 and clamped to the inner side thereof, and a portion outwardly flared and clamped against the outer side of the plate 40. In the opening in the central portion of the male member 51 is slidably positioned a stud 52 having its head portion presented outwardly and on the outside of the plate 40, the gusset member 35 is provided with an opening 70 which has a counter-bored portion 71 at its exterior end adjacent the plate 40. Positioned in the opening 70 and its counter-bored portion 71 is a sleeve or bushing member 60 of the form shown in Fig. 5. The exterior end of the bushing 60 has a counter-bored portion 61 which accommodates the inner flanges of the male member 51 and has a bore portion 62 leading from the counter-bored portion towards the inner end of the member 60 and a reduced bore 63 leading from the bore 62 to the interior end of the bushing. The shank of the stud 52 extends into the bore 62 and threadably engages in the end of the plunger member 64, which comprises a collar or guide portion 65 adapted to slidably fit the bore 62, a reduced portion 66 which receives the shank of the stud 52 and serves as a guide for the coil spring 67 which is positioned around the shank of the bolt 52 and the reduced portion 66 of the plunger 64, and which bears against the shouldered or guide portion 65 of the plunger 64. The interior end of the plunger is provided with a reduced and rounded external or cam-contacting portion 68 of the size of the bore 63 and which extends inwardly beyond the end of the bushing 60 and contacts with the exterior side of the arm 16. The arm 16 has a ridge 80 formed thereon along its exterior side which, when the arm is tipped rearwardly on its pivot 17, will strike the contact portion 68 of the plunger 64 and force it inwardly of the bushing 60, thus driving the headed end of the stud 52 against the female member 50 of the button fastener and forcing it to separate from the male member 52. The coil spring 67 is normally tensioned to force the plunger 64 outwardly in the bushing 60 and to force the contact end 68 of the plunger against the arm 16.

The fasteners 21 are positioned as shown in Figs. 1 and 2, and are the only means which fasten the edge of the covering material 20 to the frame work of the body between a point well to the rear of the pivot point 17 of the arm 16 and the end of the bow 14. Thus, when the top 11 is collapsed and the bow 14 with its arm 16 moved rearwardly, the cam-like rib 80 on the arm 16 will contact with the ends 68 of the plungers 64 and automatically force the studs 52 to detach the female members 50 of the fasteners 21 from the male members 51. This eliminates all danger of tearing the cover when collapsing the top.

Formal changes may be made in the specific embodiment of the invention described without departing from the spirit or substance of the broad invention, the scope of which is commensurate with the appended claims.

What we claim is:

1. For use in securing a vehicle top including a cam surface: a snap fastener comprising a male and a female member, means carried by one of said members and slidable therein upon engagement with said surface, to bear against and detach the other of said members.

2. For use in securing a vehicle top including a cam surface: a snap fastener comprising a male and a female member, means carried by one of said members and slidable therein upon engagement with said surface, to bear against and detach the other of said members, and means for maintaining said slidable means out of contact with the other member.

3. For use in securing a vehicle top including a cam surface: a snap fastener comprising a female socket member, a male member adapted to snap into said female member, a stud slidably carried by said male member and adapted upon reciprocation to detach the female member from the male member, and means including a plunger having a cam-contacting portion engageable by said surface to effect such reciprocation.

4. For use in securing a vehicle top including a cam surface: a snap fastener comprising a female socket member, a male member adapted to snap into said female member, a stud slidably carried by said male member and adapted upon reciprocation to bear against the interior of the female member and detach it from said male member, and means including a plunger having a cam-contacting portion engageable by said surface to effect such reciprocation.

5. For use in securing a vehicle top including a cam surface: a snap fastener comprising a female socket member, a male member adapted to snap into said female member, a stud slidably carried by said male member and adapted upon reciprocation to bear against the interior of the female member and detach it from said male member, means for normally withholding said stud from contact with said female member, and means including a plunger having a cam-contacting portion engageable by said surface to effect such reciprocation.

6. In a vehicle body having a collapsible top structure comprising pivoted bows and a flexible cover carried thereby, one of said bows having a cam surface, releasable means for securing said cover to said body adjacent the pivot points of said bows comprising a snap fastener composed of a male and a female member, one of said members being secured to the fixed body structure adjacent the pivot of a bow and the other being secured to the cover, means carried by the snap member on the body and slidable therethrough to bear against and detach therefrom the snap member on the cover, said slidable member extending into the path taken by a cam surface of said bow when folding and adapted to be actuated thereby.

7. In a vehicle body having a collapsible top structure comprising pivoted bows and a flexible cover carried thereby, one of said bows having a cam surface, releasable means for securing said cover to said body adjacent the pivot points of said bows comprising a snap fastener composed of a male and a female member, one of said members being secured to the fixed body structure adjacent the pivot of a bow and the other being secured to the cover, means carried by the snap member on the body and slidable therethrough to bear against and detach therefrom the snap member on the cover, said slidable member extending into the path taken by a cam surface of said bow when folding and adapted to be actuated thereby, and resilient means for normally maintaining said slidable means from contact with said curtain snap member and in the path of movement of said bow.

8. In a vehicle body having a collapsible top structure comprising pivoted bows carrying fastener actuating means and a flexible cover carried thereby, releasable means for securing said cover to said body adjacent the pivot points of said bows comprising a snap fastener composed of a male and a female member, one of said members being secured to the fixed body structure adjacent the pivot of a bow and the other being secured to the cover, means positioned in said body adjacent said snap member and extended into the path taken by fastener actuating means of said bow when folding and adapted to be actuated thereby to move against said snap member on said cover and detach the same from the snap member on said body.

9. In a vehicle body having a collapsible top structure comprising pivoted bows carrying fastener actuating means and a flexible cover carried thereby, releasable means for securing said cover to said body adjacent the pivot points of said bows comprising a snap fastener composed of a male and a female member, one of said members being secured to the fixed body structure adjacent the point of a bow and the other being secured to the cover, means positioned in said body adjacent said snap member and extended into the path taken by fastener actuating means of said bow when folding and adapted to be actuated thereby to move against said snap member on said cover and detach the same from the snap member on said body, and resilient means for normally maintaining said snap detaching means out of contact with said cover snap member and in the path of movement of said bow.

10. In a vehicle body having a collapsible top structure comprising pivoted bows carrying fastener actuating means and a flexible cover carried thereby, releasable means for securing said cover to said body adjacent the pivot points of said bows comprising a snap fastener composed of a male and a female member, one of said members being secured to the fixed body structure adjacent the pivot of a bow and the other being secured to the cover, a stud slidable axially through the snap member on said body to bear against the snap member on said cover and detach the same from the snap member on the body, said stud having an extension positioned in the path taken by said bow when folding and adapted to be actuated thereby, and means engaging said stud and normally maintaining the same from contact with the snap member on said cover and in the path of said bow.

11. In a vehicle body having a collapsible top structure comprising a flexible cover and a movable support therefor, separable snap fastener means carried by the body and cover for releasably securing portions of the cover to the body, and means actuated by movement of said movable top support for automatically separating said fastener means.

12. In a vehicle body having a collapsible top structure comprising a pivoted bow and a flexible cover carried thereby, separable snap fastener means secured to the body and complemental means secured to the cover for releasably securing the cover to the body, and means actuated by movement of said bow on its pivot adapted to automatically detach the such fastening means on the cover from the cooperating means on the body.

ERIC W. ERICSON.
ALEXANDER CARLSON.